(12) United States Patent
Sun et al.

(10) Patent No.: US 9,627,886 B2
(45) Date of Patent: Apr. 18, 2017

(54) STATE ESTIMATION FOR POWER SYSTEM USING HYBRID MEASUREMENTS

(75) Inventors: Hongbo Sun, Plymouth, MN (US); Zhenhua Wang, Clemson, SC (US)

(73) Assignee: Mitsubishi Electric Research Laboratoriies, Inc., Cambridge, MA (US)

( * ) Notice: Subject to any disclaimer, the term of this patent is extended or adjusted under 35 U.S.C. 154(b) by 1423 days.

(21) Appl. No.: 13/431,045

(22) Filed: Mar. 27, 2012

(65) Prior Publication Data

US 2013/0262001 A1    Oct. 3, 2013

(51) Int. Cl.
*H02J 13/00*        (2006.01)
*G06F 19/00*        (2011.01)
*H02J 3/00*         (2006.01)

(52) U.S. Cl.
CPC ............ *H02J 3/00* (2013.01); *H02J 13/0079* (2013.01); *H02J 2003/007* (2013.01); *Y02E 60/728* (2013.01); *Y02E 60/76* (2013.01); *Y04S 10/265* (2013.01); *Y04S 40/22* (2013.01)

(58) Field of Classification Search
CPC .... H02J 3/00; H02J 2003/007; H02J 13/0079; H02J 13/0062; Y02E 60/728; Y02E 60/76; Y02E 60/727; Y02E 60/74; Y04S 10/265; Y04S 10/26; Y04S 40/22
See application file for complete search history.

(56) References Cited

U.S. PATENT DOCUMENTS

| | | | |
|---|---|---|---|
| 2007/0206644 A1* | 9/2007 | Bertsch | H02J 13/0062 370/503 |
| 2008/0140326 A1 | 6/2008 | Scholtz et al. | |
| 2012/0046889 A1* | 2/2012 | Sun | H02J 3/00 702/61 |
| 2012/0179301 A1* | 7/2012 | Aivaliotis | H02J 3/00 700/286 |

FOREIGN PATENT DOCUMENTS

| | | |
|---|---|---|
| CN | 2011035461 A1 | 3/2011 |
| JP | 09205731 A | 5/1997 |
| JP | 11252795 A | 9/1999 |

OTHER PUBLICATIONS

Reynaldo Francis Nuqui; "State Estimation and Voltage Security Monitory Using Synchronized Phasor Measurements," Jul. 2, 2001; Dissertation submitted to the Faculty of the Virginia Polytech Institute.

\* cited by examiner

*Primary Examiner* — Manuel L Barbee
(74) *Attorney, Agent, or Firm* — Gene Vinokur; James McAleenan; Hironori Tsukamoto

(57) ABSTRACT

A method determines voltages of buses of a power system. Values the voltages include a magnitude and a phase angle. The buses of the power system are grouped in a first area and a second area based on a type of measurement associated with each bus. The first area and the second area have at least one common bus, and wherein at least one bus in the first area is associated with a first type of measurement, and at least one bus in the second area is associated with a second (Continued)

type of measurement. Next, the method determines sequentially voltages of the buses of the first and the second areas.

15 Claims, 6 Drawing Sheets

100

200

300

400

500

600

STATE ESTIMATION FOR POWER SYSTEM USING HYBRID MEASUREMENTS

FIELD OF THE INVENTION

This invention relates generally to electric power systems, and more particularly to estimating states of power systems using hybrid measurements.

BACKGROUND OF THE INVENTION

State estimation is an important function of a power system control center of a power utility company. The state estimator determines an optimal estimate of the current state of the power system, based on the available measurements. The state of the system can be described by a magnitude and phase angle of voltages of each bus in the power system.

The measurements are commonly acquired by supervisory control and data acquisition (SCADA) systems through remote terminal units (RTUs) connected to buses of the power system. SCADA systems provide real-time measurements of bus voltages and power flows among the buses, but these measurements might not be acquired simultaneously. The typical SCADA measurements are voltage magnitude of buses, and active and reactive powers of branches connected to the buses. Various state estimation methods based on SCADA measurements are known, including weighted least square estimator, non-quadratic estimator, least absolute value estimator, leverage point estimator, and least median of squares estimator.

With the increasing use of synchronized phasor measurement units (PMU) in power systems, the PMU devices are becoming a common data source for the state estimation. The PMUs provide synchronized measurements from dispersed locations. Furthermore, the measurement frequency and accuracy of PMUs are better than those of SCADA systems. The PMU measurements typically include phasor voltages of buses, and phasor currents of branches connected to the buses.

The accuracy of state estimation can be increased by including the PMU measurements in the estimation procedure. One of the major challenges of state estimation with hybrid SCADA and PMU measurements is determining an accurate solution in a reasonable time. Accordingly, there is a need for determining a state estimation for power system using hybrid measurements, such as SCADA and PMU measurements.

SUMMARY OF THE INVENTION

One objective of various embodiments of invention is to provide a fast and accurate state estimation method suitable for power systems with hybrid SCADA and PMU measurements. The embodiments of the invention are based on a realization that the efficiency of state estimation is improved without sacrificing estimation accuracy by grouping the buses of a power system into a set of areas based on the connectivity of topology and type of measurement units associated with buses and solving those areas sequentially according to the metering accuracy level of associated measurement units. Each area is formed by the connected buses whose voltages are either measured by same type of measurement units, or can be inferred from the measurements provided by an adjacent bus whose voltages are measured by the type of measurement units. The state of buses in an area with higher level of metering accuracy are solved first, including the common buses that shared by the area with areas with different type of measurement units. Then the buses of the areas with lower level of accuracy are solved based on the results of common buses solved in the first level.

In one embodiment, a power system with hybrid SCADA and PMU measurements is decoupled into PMU observed areas and SCADA observed areas. A PMU observed area includes buses whose voltages are directly measured by a PMU device, and terminal buses of branches that connected to buses with PMUs, and the currents on the branches are measured by the PMU device. A SCADA observed area includes buses whose voltages are measured by a RTU device, and terminal buses of branches that connected to buses with RTUs, and the powers on the branches are measured by the RTU device. The state of the system is determined with two-level computation procedure in which the states of PMU observed areas are determined first, and the states of SCADA observed areas are determined next using at least part of the solutions of the PMU observed areas.

The embodiments of the invention are also based on realization that decoupling the power system based on the type of measurement unit associated with buses can simplify the model for each type of areas. A more simplified model is formulated based on the characteristics of measurements for each type of areas, and accordingly the computation burden of state estimation is further reduced.

In some embodiments, based on weighted least square principles, a linear model is formulated for a PMU observed area with rectangular coordinates, and a nonlinear model is formulated for a SCADA observed area with polar coordinates. The complexity and dimensions of estimation models are significantly reduced compared with a conventional single-level nonlinear model if both SCADA and PMU measurements are included.

Another realization is that adding pseudo measurements converted from measurements provided by other types of measurement units can be advantageously used to compensate the inaccuracy resulting from the bad data occurring in the type of measurement units in the study area, and adding the estimate results of first level on common buses as pseudo measurements into second level can also be beneficial to the improvement of estimation accuracy.

In some embodiments, a first model for a PMU observed area includes both PMU measurements of bus voltages and branch currents, and pseudo branch current measurements derived from SCADA active and reactive power measurements. The second model for a SCADA observed area includes the SCADA measurements of bus voltage magnitude, and branch active and reactive powers, and pseudo measurements of bus voltage magnitude and phase angle generated by results at the first level. The states of buses associated with PMU are determined at the first level. The common buses between the PMU and SCADA observed areas are initially determined at the first level, and updated at the second level. The states of remaining buses are determined at the second level.

Accordingly, one embodiment discloses a method for determining voltages of at least some buses of a power system, wherein a value of a voltage includes a magnitude and a phase angle of the voltage. The method includes grouping the buses of the power system in at least a first area and a second area based on a type of measurement associated with each bus, wherein the first area and the second area has at least one common bus, and wherein at least one bus in the first area is associated with a first type of measurement, and at least one bus in the second area is associated with a second type of measurement; determining voltages of the buses of the first area including a voltage of the common bus based on the first type of measurements; and determining voltages of the buses of the second area using the voltage of the common bus determined for the first area and the second type of measurements.

Another embodiment discloses a method for determining voltages of buses of a power system based on hybrid measurements provided by phasor measurement units (PMUs), and remote terminal units (RTUs) of supervisory control and data acquisition (SCADA) system, wherein a value of a voltage includes a magnitude and a phase angle of the voltage, and wherein a PMU provide measurements of a voltage of a bus and current of a branch, and a RTU provides measurements of a magnitude of voltage of a bus and active and reactive powers of a branch. The method includes grouping the buses of the power system into a set of PMU areas and a set of SCADA areas, where a PMU area has at least one bus common with a SCADA area, and wherein the PMU area is formed by PMU buses and buses adjacent to at least one PMU bus, and wherein the SCADA area is formed by SCADA buses; and determining sequentially voltages of the buses of the PMU area, and voltages of the buses of the SCADA area, wherein the steps of the method are performed by a processor.

Yet another embodiment discloses a system for estimating states of buses of a power system based on hybrid measurements provided by phasor measurement units (PMUs), and remote terminal units (RTUs) of supervisory control and data acquisition (SCADA) system, wherein a value of a voltage includes a magnitude and a phase angle of the voltage, and wherein a PMU provide measurements of a voltage of a bus and current of a branch, and a RTU provides measurements of a magnitude of voltage of a bus and active and reactive powers of a branch. The system includes a processor for grouping the buses of the power system into a set of PMU areas and a set of SCADA areas, where a PMU area has at least one bus common with a SCADA area, and wherein the PMU area is formed by PMU buses and buses adjacent to at least one PMU bus, and wherein the SCADA area is formed by SCADA buses, and for determining states of the buses in the set of PMU areas based on the measurements provided by the PMUs and pseudo measurements determined from SCADA measurements provided by the RTUs, and for determining states of the buses in the set of SCADA areas based on the measurements provided by the RTUs and a state of the common bus.

DETAILED DESCRIPTION OF THE PREFERRED EMBODIMENTS

PMU and SCADA Observed Areas

Figure 1:
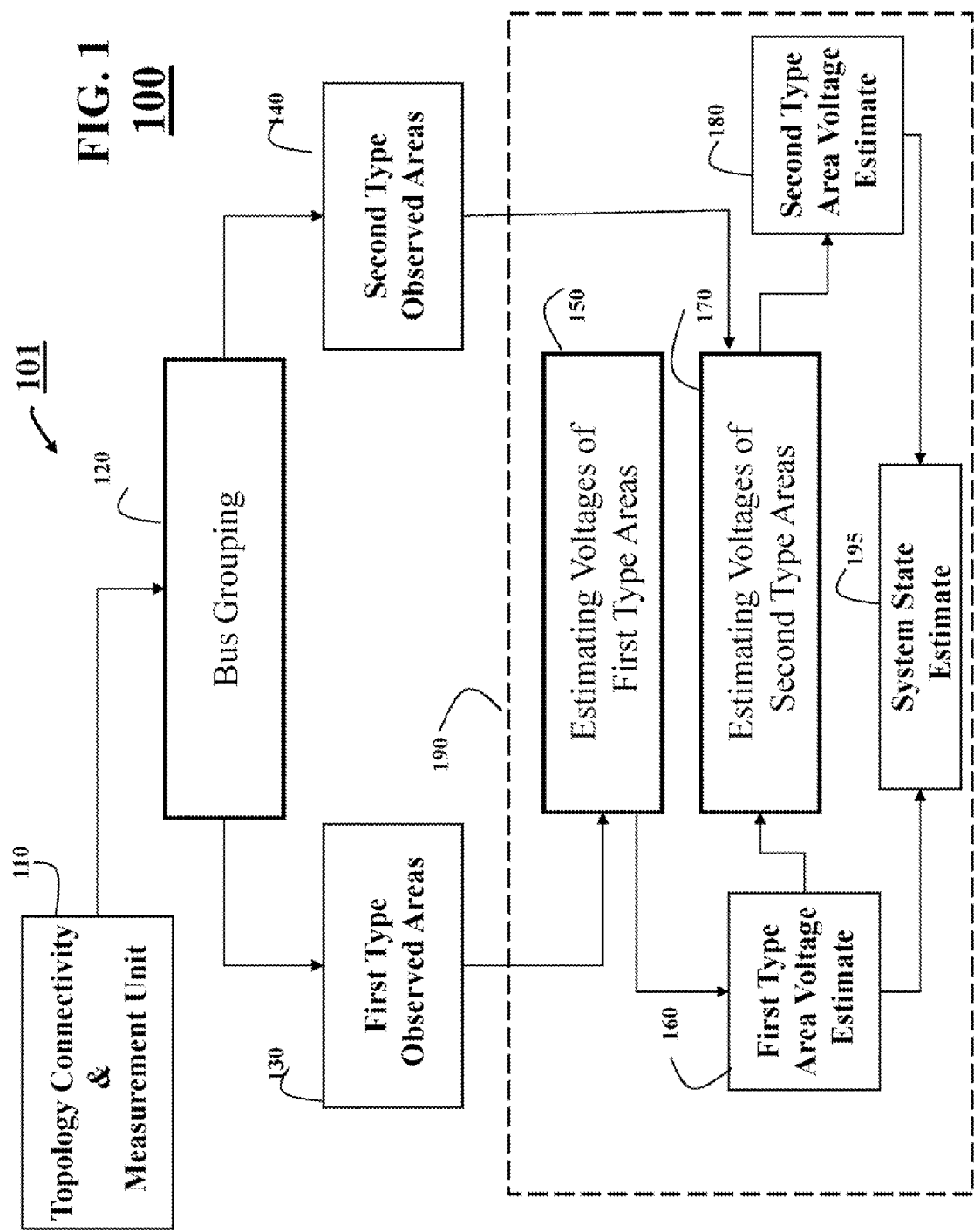
FIG. 1 is a block diagram of a method for determining voltages of buses of a power system with multiple types of measurement units according to some embodiments of invention.

FIG. 1 shows a method 100 for estimating a state of a power system according to various embodiments of the invention. The state is estimated with hybrid measurements provided by at least two different types of measurement units. In some embodiments, the types of the measurement units include a phasor measurement unit (PMU) providing a first type of measurement, and a remote terminal unit (RTU) of a supervisory control and data acquisition (SCADA) system providing a second type of measurement.

Based on the topology connectivity and a type of measurement unit 110, the buses of the power system are grouped 120 into a set of areas, including first type observed areas 130 and second type observed areas 140. The states of the first and second type observed areas are analyzed sequentially 190 according to various embodiments of the invention. For example, state estimate of the first type areas 160 are determined 150 based on the measurements on the area. Then, state estimate of second type areas 180 are determined 170 based on the results obtained in 150 and measurements on the areas. Finally, the full set of state estimate for the system is generated 195. The method 100 can be performed in a processor 101. The grouping 120 of the system can be predetermined and stored into a memory.

According to the type of measurement unit associated with each bus, the buses of a power system are grouped into a set of areas, including first type observed areas and second type observed areas, wherein the first type observed area and the second type observed area has at least one common bus, and wherein at least one bus in the first type observed area is associated with a first type of measurement unit, and at least one bus in the second type observed area is associated with a second type of measurement unit. A common bus is associated with the second type of measurement unit, and is adjacent to a bus associated with the first type of measurement unit.

Figure 2:
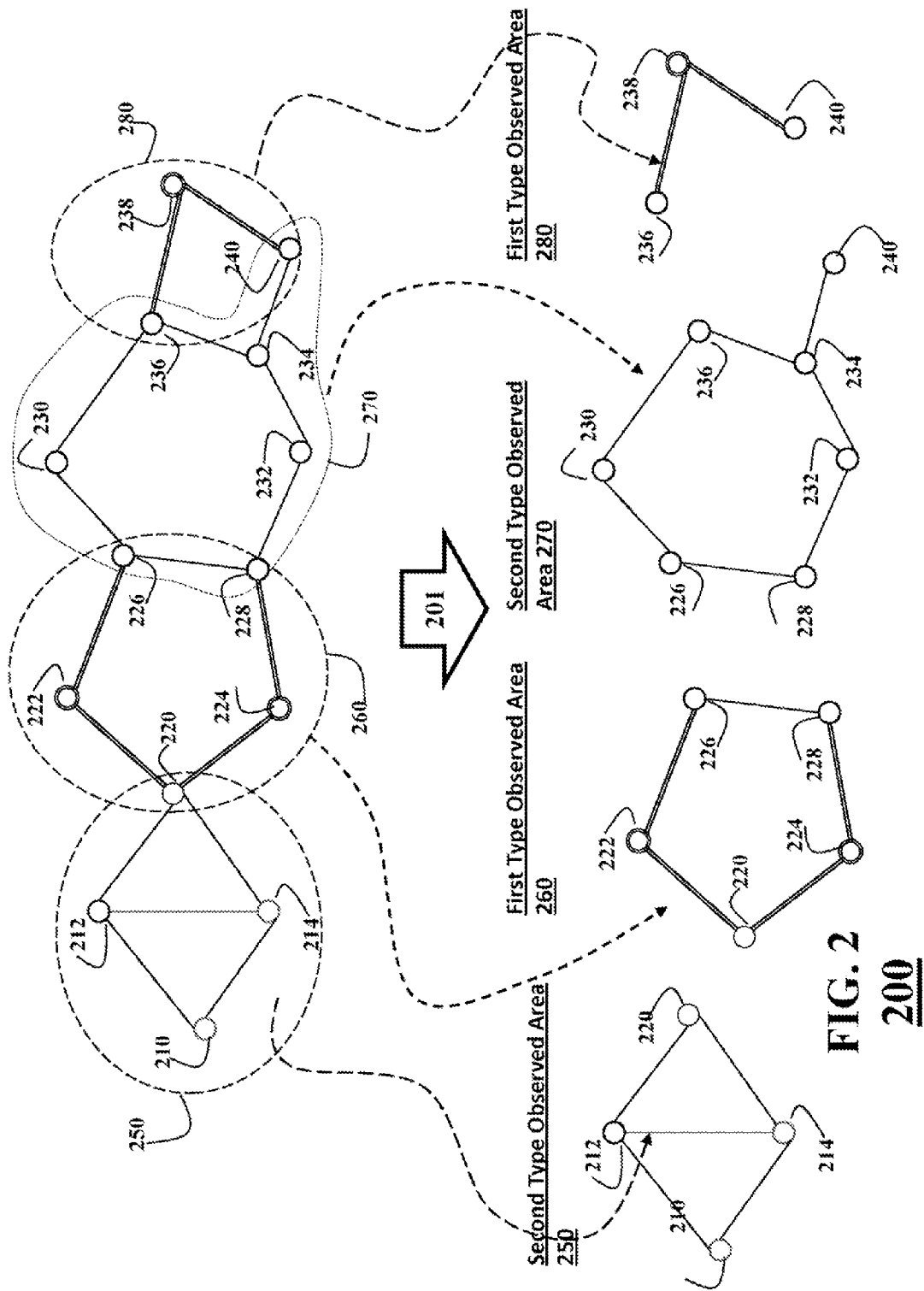
FIG. 2 is a schematic of grouping buses of a power system according to types of measurement units associated with the buses according to some embodiments of the invention.

FIG. 2 shows an example of grouping the buses of a power system into the areas of the first and second types. In the FIG. 2, any double-line circle represents a bus associated, e.g., equipped, with the first type of measurement unit, and any single-line circle represents a bus associated with the second type of measurement unit, and double-line branches are measured by the first type measurement units, and single-line branches are measured by the second type of measurement units. For example, the buses 222, 224 and 238 are associated with the first type measured units, and all other buses are associated with the second type measured units.

Accordingly, the buses of the power system of FIG. 2 are grouped into two areas of the first type, 260 and 280 and two areas of the second type, 250 and 270. Each area includes buses associated with a specific type of measurement units, and terminal buses of branches which are measured by the specific type measurement units, and branches connected to those buses.

The first area 260 includes the buses 220, 222, 224, 226 and 228, in which buses 222 and 224 are associated with first type of measurement units. The first area 280 includes the buses 236, 238 and 240, in which the bus 238 is associated with the first type of measurement unit.

The second area 250 includes the buses 210, 212, 214 and 220, in which bus 220 is a common bus between the first area 260 and the second area 250. The second area 270 includes buses 226, 228, 230, 232, 234, 236 and 240. Buses 226, 228, 236 and 240 are common buses between the second area 270 and the first areas 260 and 280.

Similarly, in the embodiments for a power system with hybrid SCADA and PMU measurements, the buses are grouped into a set of PMU observed areas and a set of SCADA observed areas. The PMU observed area includes buses connected to PMU devices, and terminal buses of branches that are measured by the PMU devices. The SCADA observed area includes buses connected to RTU devices, and terminal buses of branches which are measured by the RTU devices. The common buses are the buses included in both the PMU observed areas and the SCADA observed areas.

The state of the power system is solved with two-level computation procedure in which the states of PMU areas are determined first, and then the states of SCADA areas are determined next based in the solutions of states for the PMU areas.

The embodiments of the invention are also based on realization that decoupling the power system based on the type of measurement unit associated with buses can simplify the model for each type of areas. A more simplified model is formulated based on the characteristics of measurements for each type of areas, and accordingly the computation burden of state estimation is further reduced.

Models of Components of Power System

In one embodiment, a model of state estimation is formulated based on the models of components in the power system. The typical components include transmission lines and transformers, and their models are shown in FIG. 3 and FIG. 4 in the form of circuit diagrams.

Transmission Line Branch

Figure 3:
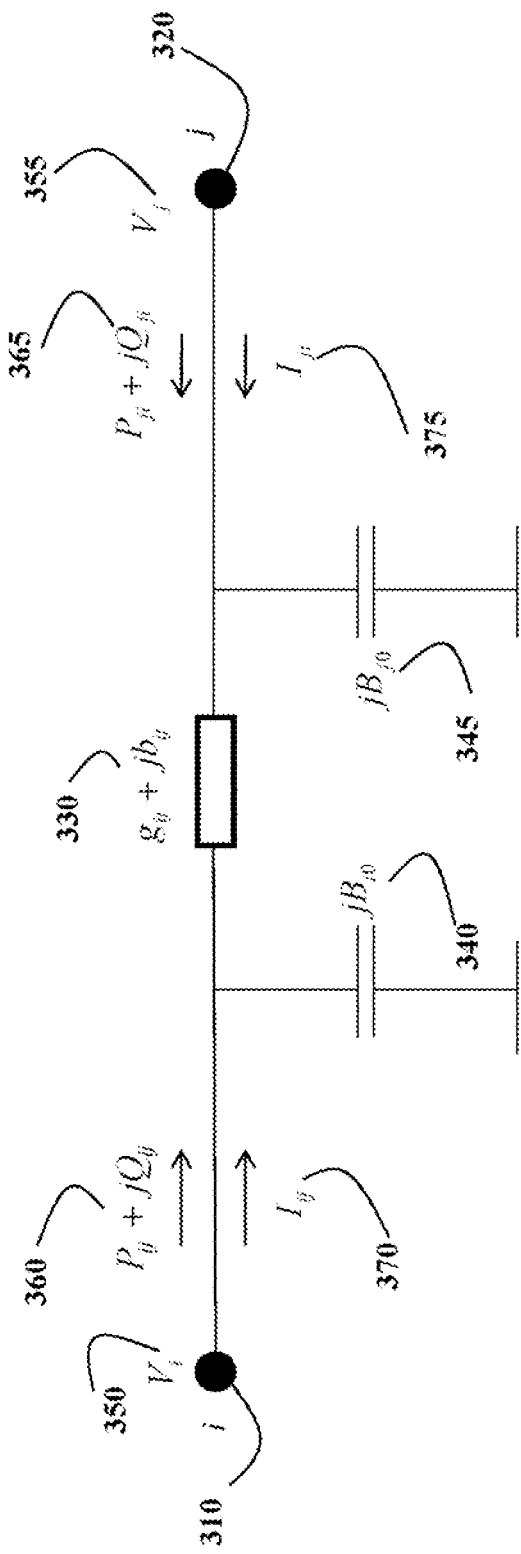
FIG. 3 is a circuit diagram modeling a transmission line branch.
Figure 4:
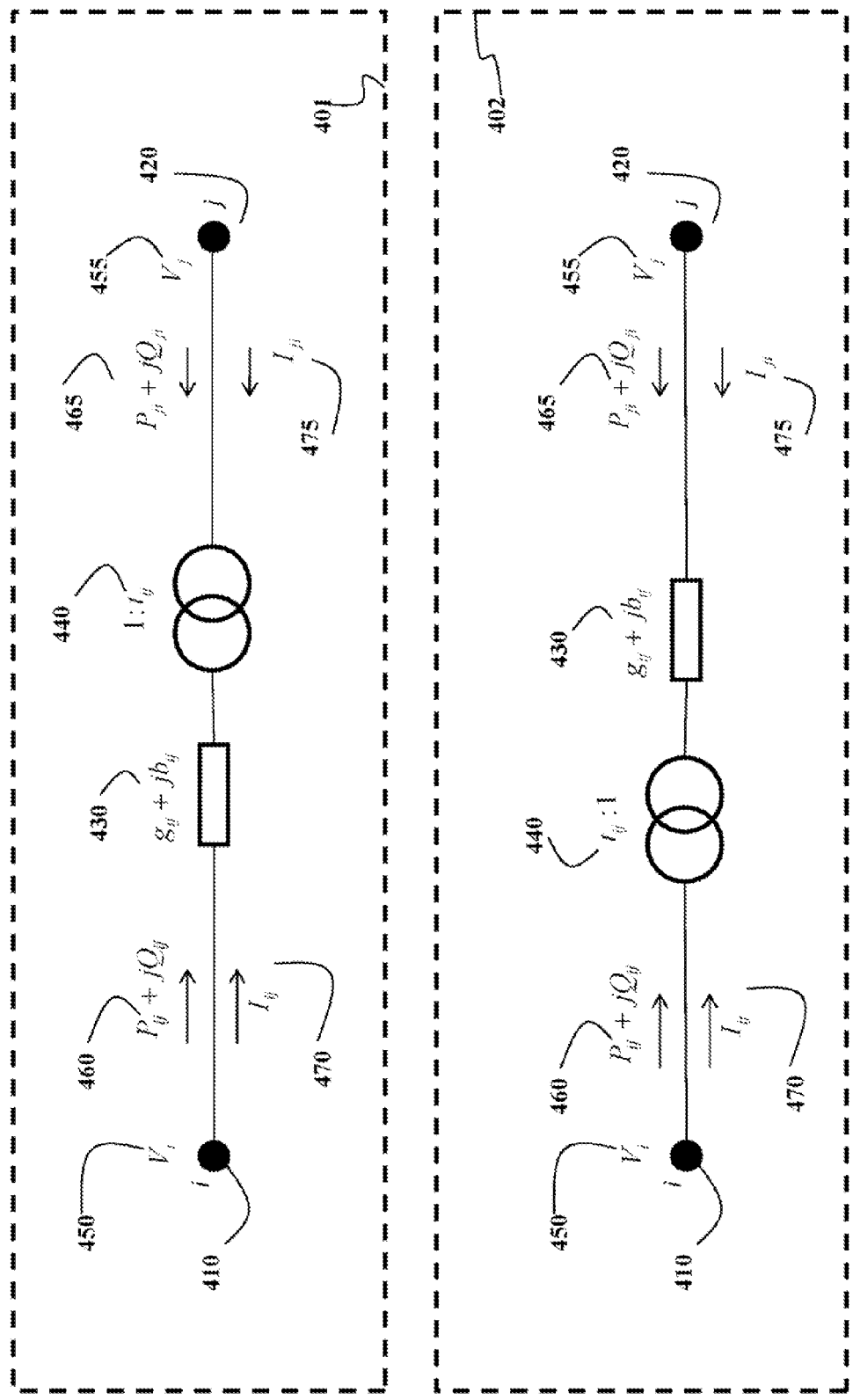
FIG. 4 is a circuit diagram modeling a transformer branch.

FIG. 3 shows a model 300 for a transmission line branch connecting a bus i 310 and a bus j 320. The transmission line branch between the two buses is modeled as one series branch with admittance 330 and two shunt branches at two terminal buses with admittances 340 and 345. The series admittance includes a real part, $g_{ij}$ and an imaginary part $b_{ij}$. The shunt admittances includes only imaginary parts $b_{i0}$ and $b_{j0}$.

Attributes describing the steady-states of the transmission line include the complex voltages at two terminal buses i and bus j, $V_i$ 350 and $V_j$ 355, complex currents entering the branch through bus i and bus j, $I_{ij}$ 370 and $I_{ji}$ 375, and complex powers entering the branch through bus i and bus j, $P_{ij}+jQ_{ij}$ 360 and $P_{ji}+jQ_{ji}$ 365. The complex powers include the active powers, $P_{ij}$ and $P_{ji}$, reactive powers, $Q_{ij}$ and $Q_{ji}$.

The measurement units are usually connected to a bus, and provide various measurements of the bus and branches connected to the bus. The PMU associated with a bus measures the complex voltage of the bus, and the complex currents of branches connected to the bus. For example, if the PMU is installed at bus i 310, the PMU can provide measurements of the voltage of bus i, $V_i$ 350, and the current entering the branch between bus i 310 and bus j 320 through bus i, $I_{ij}$ 370. The RTU associated with a bus measures the magnitude of the voltage of the bus, and the active and reactive powers of branches connected to the bus. In FIG. 3, if bus i 310 is equipped with a RTU, then the RTU provides measurements for the magnitude of the voltage of bus i, and the active and reactive powers entering the branch between bus i 310 and bus j 320 through bus i 310, $P_{ij}$ and $Q_{ij}$.

The complex voltage of a bus can be represented with either rectangular components as $$V_i = V_{ir} + jV_{im}, \quad (1)$$

or polar components as:

$$V_i = |V_i| \angle \theta_{V_i}, \quad (2)$$

wherein $V_{ir}$ and $V_{im}$ are the real and imaginary part of voltage at bus i, $V_i$, and $|V_i|$ and $\theta_{V_i}$ are the magnitude and phase angle of voltage at bus i, where $\angle$ represents the phase.

Similarly, the complex currents of a branch can also be represented with rectangular components, $$I_{ij} = I_{ijr} + jI_{ijm}, \quad (3)$$

or polar components:

$$I_{ij} = |I_{ij}| \angle \theta_{I_{ij}}, \quad (4)$$

wherein $I_{ijr}$ and $I_{ijm}$ are the real and imaginary part of current flowing from bus i to bus j, $I_{ij}$, and $|I_{ij}|$ and $\theta_{I_{ij}}$ are the magnitude and phase angle of the current from bus i to bus j.

Using the rectangular coordinates, the relationship between the currents of a line branch and the voltages of its terminal buses can be described according to:

$$I_{ijr} = g_{ij}V_{ir} - (b_{i0}+b_{ij})V_{im} - g_{ij}V_{jr} + b_{ij}V_{jm}, \quad (5)$$

$$I_{ijm} = (b_{i0}+b_{ij})V_{ir} + g_{ij}V_{im} - b_{ij}V_{jr} - g_{ij}V_{jm}, \quad (6)$$

wherein $V_{jr}$ and $V_{jm}$ are the real and imaginary part of the voltage at bus j.

Using the polar coordinates, the relationship of active and reactive powers of a line branch and the voltages of its terminal buses can be described according to:

$$P_{ij} = |V_i|^2 g_{ij} - |V_i||V_j|[g_{ij}\cos(\theta_{V_i}-\theta_{V_j}) + b_{ij}\sin(\theta_{V_i}-\theta_{V_j})], \quad (7)$$

$$Q_{ij} = -|V_i|^2(b_{i0}+b_{ij}) + |V_i||V_j|[b_{ij}\cos(\theta_{V_i}-\theta_{V_j}) - g_{ij}\sin(\theta_{V_i}-\theta_{V_j})], \quad (8)$$

wherein $|V_j|$ and $\theta_{V_j}$ are the magnitude and phase angle of the voltage at bus j.

Transformer Branch

FIG. 4 shows a model 400 for a transformer branch connecting a bus r 410 and a bus j 420. The buses are connected by a series admittance $g_{ij}+jb_{ij}$ 430 and an ideal transformer with ratio $t_{ij}$ 440. FIG. 4 shows two different types of connections for a transformer branch, 401, and 402. In the configuration 401, the transformer ratio of the ideal transformer is at the side of bus j. Reversely, the transformer ratio is at the side of bus i for the configuration 402. The attributes describing the steady-state behaviors of the transformer branch include the complex voltages at two terminal buses i and j, $V_i$ 450 and $V_j$ 455, complex currents flowing from bus i 410 to bus j 420, and from bus j 420 to bus i 410, $I_{ij}$ 470 and $I_{ji}$ 475, and complex powers flowing from bus i 410 to bus j 420, and bus j 420 to bus i 410, $P_{ij}+jQ_{ij}$ 460 and $P_{ji}+jQ_{ji}$ 465.

Using the rectangular coordinates, the relationship between the currents of a transformer branch and the voltages of its terminal buses can be expressed as Equation (9) and (10) for the connection 401, and Equation (11) and (12) for the connection 402:

$$I_{ijr} = g_{ij}V_{ir} - b_{ij}V_{im} - \frac{g_{ij}}{t_{ij}}V_{jr} + \frac{b_{ij}}{t_{ij}}V_{jm}, \quad (9)$$

$$I_{ijm} = b_{ij}V_{ir} + g_{ij}V_{im} - \frac{b_{ij}}{t_{ij}}V_{jr} - \frac{g_{ij}}{t_{ij}}V_{jm}, \quad (10)$$

$$I_{ijr} = \frac{g_{ij}}{t_{ij}^2}V_{ir} - \frac{b_{ij}}{t_{ij}^2}V_{im} - \frac{g_{ij}}{t_{ij}}V_{jr} + \frac{b_{ij}}{t_{ij}}V_{jm}, \quad (11)$$

-continued $$I_{ijm} = \frac{b_{ij}}{t_{ij}^2}V_{ir} + \frac{g_{ij}}{t_{ij}^2}V_{im} - \frac{b_{ij}}{t_{ij}}V_{jr} - \frac{g_{ij}}{t_{ij}}V_{jm}. \quad (12)$$

Using the polar coordinates, the relationship of active and reactive powers of a transformer branch and the voltages of its terminal buses can be expressed by Equation (113) and (14) for the connection 401, and equations (15) and (16) for the circuit 402:

$$P_{ij} = |V_i|^2 g_{ij} - \frac{|V_i||V_j|}{t_{ij}}[g_{ij}\cos(\theta_{V_i} - \theta_{V_j}) + b_{ij}\sin(\theta_{V_i} - \theta_{V_j})], \quad (13)$$

$$Q_{ij} = -|V_i|^2 b_{ij} + \frac{|V_i||V_j|}{t_{ij}}[b_{ij}\cos(\theta_{V_i} - \theta_{V_j}) - g_{ij}\sin(\theta_{V_i} - \theta_{V_j})], \quad (14)$$

$$P_{ij} = \frac{|V_i|^2 g_{ij}}{t_{ij}^2} - \frac{|V_i||V_j|}{t_{ij}}[g_{ij}\cos(\theta_{V_i} - \theta_{V_j}) + b_{ij}\sin(\theta_{V_i} - \theta_{V_j})], \quad (15)$$

$$Q_{ij} = -\frac{|V_i|^2}{t_{ij}^2}b_{ij} + \frac{|V_i||V_j|}{t_{ij}}[b_{ij}\cos(\theta_{V_i} - \theta_{V_j}) - g_{ij}\sin(\theta_{V_i} - \theta_{V_j})], \quad (16)$$

Weighted Least Square Estimation of PMU Areas

For the PMU area, the relationship between the measurements and state variables can be described as $$z = Hx + e, \quad (17)$$

where, z is a measurement vector, x is a state vector, H is a constant coefficient matrix to represent a linear relationship between the measurements and the states, and e is a measurement error vector.

The covariance matrix of measurement error is $$R = E\{ee^T\} \quad (18)$$

wherein $e^T$ is a transpose of vector e, and $E\{.\}$ represents the expectation. According to some embodiments, the state estimation is based on another realization that the distribution of measurements follows a normal distribution and measurements are uncorrelated. Therefore, the covariance matrix is a diagonal matrix, and the i-th diagonal element of the covariance matrix is the variance of the i-th measurement $z_i$, $\sigma_{z_i}^2$, and $\sigma_{z_i}$ is the standard deviation of the measurement.

According to a weighted least square principle, the state estimate can be determined by solving a minimization of the scaling function J(x), thus:

$$J(x) = [z - Hx]^T R^{-1} [z - Hx]. \quad (19)$$

The system state can be solved according to the normal equation expressed as follows:

$$Gx = H^T R^{-1} z, \quad (20)$$

wherein G is a gain matrix, $G = H^T R^{-1} H$. Equation (20) is solved using a sparse Cholesky decomposition.

The covariance of the estimate $\hat{x}$ is $Cov(\hat{x}) = G^{-1}$. For simplification purposes, the variance of any state estimate can be approximated as $$\sigma_{\hat{x}}^2 = \frac{\hat{x}_i}{(H^T R^{-1} z)_i}, \quad (21)$$

wherein, $\hat{x}_i$ is the i-th state estimate, $\sigma_{\hat{x}_i}^2$ is the variance of the estimate, and $(H^T R^{-1} z)_i$ is the i-th element of right hand side of Equation (20).

States and Measurements of Linear Estimation Model

One embodiment uses rectangular coordinates to formulate the state estimation model for the PMU areas. The states for each PMU area are represented by the real and imaginary parts of complex voltages for each bus in the area:

$$x = \begin{bmatrix} V_r \\ V_m \end{bmatrix}, \quad (22)$$

wherein $V_r$ and $V_m$ are the vectors of real part and imaginary part of voltages of buses in the PMU observed area respectively.

The measurements for each PMU area includes the PMU voltage measurements of buses, PMU currents measurements of branches, and pseudo current measurements of branches that derived from active and reactive power measurements from RTUs:

$$z = \begin{bmatrix} V_r^{PMU} \\ V_m^{PMU} \\ I_r^{PMU} \\ I_m^{PMU} \\ I_r^{PSEUDO} \\ I_m^{PSEUDO} \end{bmatrix}, \quad (23)$$

wherein $V_r^{PMU}$ and $V_m^{PMU}$ are the vectors of real part and imaginary part of PMU voltage measurements of buses, $I_r^{PMU}$ and $I_m^{PMU}$ are the vectors of real part and imaginary part of PMU current measurements of line or transformer branches, and $I_r^{PSEUDO}$ and $I_m^{PSEUDO}$ in are the vectors of pseudo current measurements derived from RTU active and reactive power measurements of line or transformer branches.

Accordingly, the measuring error vector and covariance matrix can be partitioned based on the type of measurements:

$$e = \begin{bmatrix} e_{V_r^{PMU}} \\ e_{V_m^{PMU}} \\ e_{I_r^{PMU}} \\ e_{I_m^{PMU}} \\ e_{I_r^{PSEUDO}} \\ e_{I_M^{PSEUDO}} \end{bmatrix}, \quad (24)$$

$$R = diag\{\sigma_{V_r^{PMU}}^2, \sigma_{V_m^{PMU}}^2, \sigma_{I_r^{PMU}}^2, \sigma_{I_m^{PMU}}^2, \sigma_{I_r^{PSEUDO}}^2, \sigma_{I_M^{PSEUDO}}^2\}, \quad (25)$$

wherein, $e_{V_r^{PMU}}$, $e_{V_m^{PMU}}$, $e_{I_r^{PMU}}$, $e_{I_m^{PMU}}$, $e_{I_r^{PSUEDO}}$, $e_{I_r^{PSEUDO}}$ represents the measuring errors of real and imaginary part of PMU voltage measurements, real and imaginary part of PMU current measurements, $\sigma_{V_r^{PMU}}^2$, $\sigma_{V_m^{PMU}}^2$, $\sigma_{I_r^{PMU}}^2$, $\sigma_{I_m^{PMU}}^2$, $\sigma_{I_r^{PSEUDO}}^2$ and $\sigma_{I_M^{PSEUDO}}^2$ represents the variances of real and imaginary part of PMU voltage measurements, real and imaginary part of PMU current measurements, and real and imaginary part of pseudo current measurements respectively.

The PMU measurements and associated variances are usually given in terms of polar coordinates, that is in the form of the magnitude and phase angle. Those values have to be converted into rectangular form to be used in the state estimation procedure. The PMU measurements of voltages and currents in rectangular coordinates can be determined using Equation (26) and (27) for voltage measurements, and equation (28) and (29) for current measurements based on the PMU measurements given in polar coordinates:

$$V_{ir} = |V_i| \cos \theta_{V_i}, \quad (26)$$

$$V_{im} = |V_i| \sin \theta_{V_i}, \quad (27)$$

$$I_{ijr} = |I_{ij}| \cos \theta_{I_{ij}}, \quad (28)$$

$$I_{ijm} = |I_{ij}| \sin \theta_{I_{ij}}, \quad (29)$$

Some embodiments use Equation (30) to determine the variances of measurements based on the given variances in other format. If a measurement of a required variable is not available, but can be determined from other known actual or pseudo measurement variables, then one embodiment determines a variance of the required variable according to $$\sigma_{z_i}^2 = \sum_j^m \left[ \left( \frac{\partial f}{\partial y_j} \right)^2 \sigma_{y_j}^2 \right] \quad (30)$$

wherein $z_i$ and $\sigma_{z_i}^2$ are the measurement value and variance of required variable, $y_j$ and $\sigma_{y_j}^2$ are the measurement value and variance of j-th associated known variable, f is a scalar function to express the relationship between the required variable and the known variables according to $$z_i = f(y_1, y_2, \ldots, y_m) \quad (31)$$

wherein $\partial f / \partial y_j$ is the derivative of the required variable $z_i$ with respect to the known variable $y_j$, and in is the total number of associated variables used to determine the required variable.

Based on Equations (30), (26) and (27), the variances of real and imaginary part of voltages can be determined according to:

$$\sigma_{V_{ir}}^2 = \cos^2 \theta_{V_i} \sigma_{|V_i|}^2 + |V_i|^2 \sin^2 \theta_{V_i} \sigma_{\theta_{V_i}}^2, \quad (32)$$

$$\sigma_{V_{im}}^2 = \sin^2 \theta_{V_i} \sigma_{|V_i|}^2 + |V_i|^2 \cos^2 \theta_{V_i} \sigma_{\theta_{V_i}}^2, \quad (33)$$

wherein, $\sigma_{V_{ir}}^2$ and $\sigma_{V_{im}}^2$ are the required variances of real and imaginary part of voltage at bus i, $\sigma_{|V_i|}^2$ and $\sigma_{\theta_{V_i}}^2$ are given variances of the magnitude and angle of voltage at bus i. Similarly, based on equations (30), (28) and (29), the variances of real and imaginary part of currents can be determined according to:

$$\sigma_{I_{ijr}}^2 = \cos^2 \theta_{I_{ij}} \sigma_{|I_{ij}|}^2 + |I_{ij}|^2 \sin^2 \theta_{I_{ij}} \sigma_{\theta_{I_{ij}}}^2, \quad (34)$$

$$\sigma_{I_{ijm}}^2 = \sin^2 \theta_{I_{ij}} \sigma_{|I_{ij}|}^2 + |I_{ij}|^2 \cos^2 \theta_{I_{ij}} \sigma_{\theta_{I_{ij}}}^2, \quad (35)$$

wherein, $\sigma_{I_{ijr}}^2$ and $\sigma_{I_{ijm}}^2$ are the required variances of real and imaginary part of current of line or transformer branch flowing from bus i to bus j, $\sigma_{|I_{ij}|}^2$ and $\sigma_{\theta_{I_{ij}}}^2$ are given variances of the magnitude and angle of current flowing from bus i to bus j.

The pseudo current measurements can be determined based on the given active and reactive power measurements from RTUs. If a PMU voltage measurement is given for the same terminal bus that the RTU power measurements are measured, the pseudo current measurements can be determined accordingly.

Taken a branch between bus i and bus j as example, if the voltage of bus j is provided by a PMU, and the powers of the branch is also provided by a RTU at the same terminal bus j, then the corresponding currents flowing from bus j to bus i can be determined according to:

$$I_{jir} = \frac{P_{ji} V_{jr} + Q_{ji} V_{jm}}{V_{jr}^2 + V_{jm}^2}, \quad (36)$$

$$I_{jim} = \frac{P_{ji} V_{jm} - Q_{ji} V_{jr}}{V_{jr}^2 + V_{jm}^2}, \quad (37)$$

wherein, $I_{jir}$ and $I_{jim}$ are the required real and imaginary part of pseudo measurements of currents flowing from bus j to bus i, $P_{ji}$ and $Q_{ji}$ are the active and reactive powers flowing from bus j to bus i that measured by a RTU at bus j, $V_{jr}$ and $V_{jm}$ are the real and imaginary part of voltage that measured by a PMU at bus j. The variance of the pseudo currents can be determined using Equation (30) and Equation (36) and (37).

Figure 5:
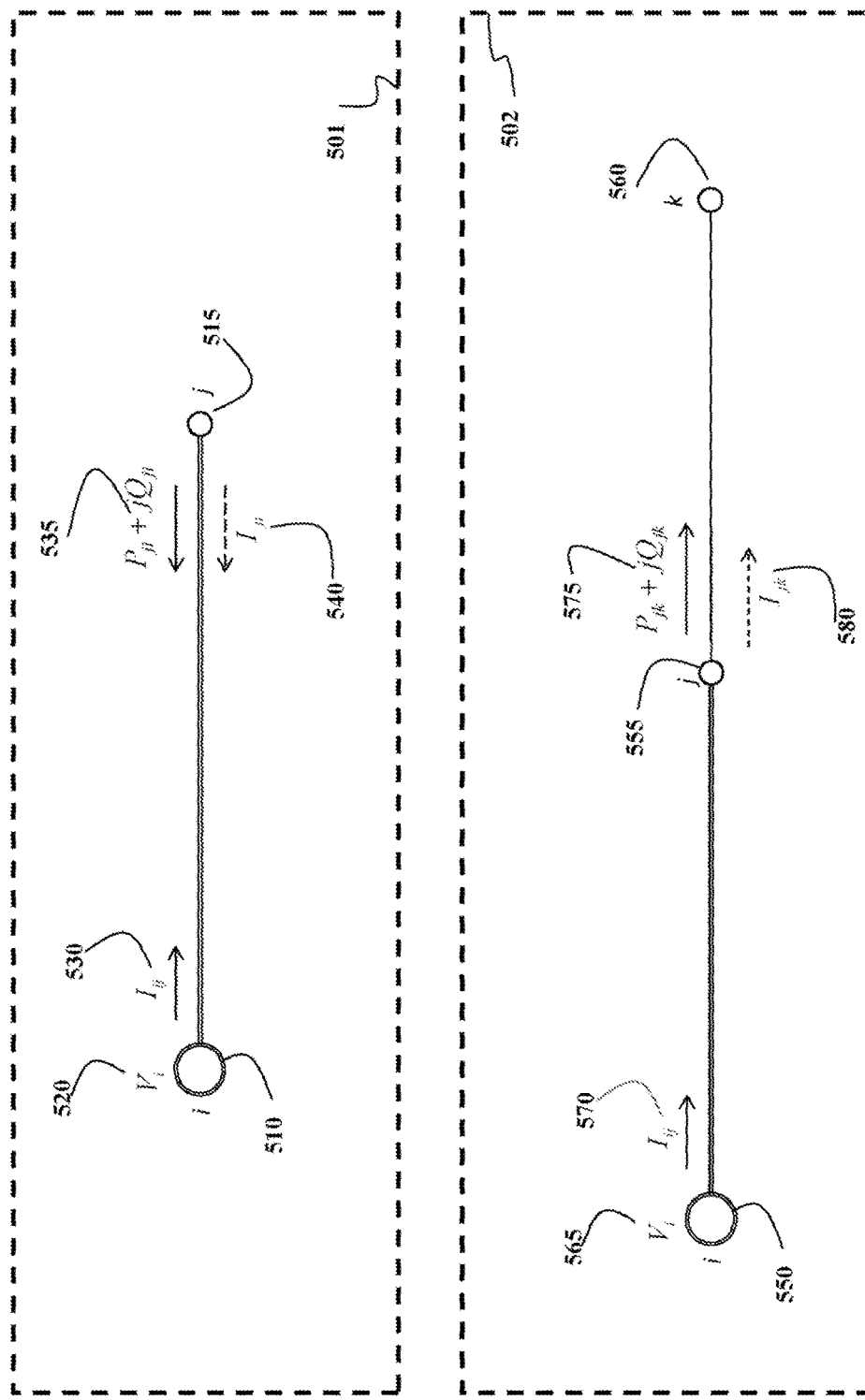
FIG. 5 are schematics of transforming SCADA active and reactive power measurements into pseudo current measurements of a branch.

As shown in FIG. 5, if the PMU bus voltage at the required terminal is not available, then a calculated bus voltage at the same terminal is determined first, and then used together with the SCADA measurements acquired from the RTUs to determine the required pseudo current measurements.

FIG. 5, shows examples of transforming 500 SCADA active and reactive power measurements into pseudo current measurements. In addition to using the same conventions for FIG. 2, the arrow with dashed lines represents the associated current is a pseudo measurement to be determined. FIG. 5 shows two examples, 501 and 502.

The example 501 represents a situation when a branch is measured by both RTU and PMU but at a different side of the branch. The voltage of bus associated with RTU is determined first based on the PMU voltage and current measurements at the opposite side to the bus with RTU. Then, the pseudo currents are calculated based on the RTU power measurements and calculated voltage at the same bus accordingly. In the scenario, the branch connects bus i, 510 and bus j, 515. The active and reactive powers flowing from bus j to bus $P_{ji} + jQ_{ji}$ 535 are measured by a RTU at bus j, 515, but the voltage of bus j, 515 is not provided. The opposite side bus i, 510 is equipped with a PMU, and both the voltage at bus i, $V_i$ 520 and current flowing from bus i to bus j, $I_{ij}$ 530 are measured. Thus, a calculated voltage of bus j, $V_j$ is firstly determined based on the voltage of bus i, $V_i$ 520 and current flowing from bus i to bus j, $I_{ij}$ 530 by using Equation (38) and (39) for a line branch, and Equation (40) and (41) for a transformer branch with the transformer ratio at the side of bus j, and Equation (42) and (43) for a transformer branch with the transformer ratio at the side of bus i.

$$V_{jr} = \left(1 - \frac{b_{ij} b_{i0}}{g_{ij}^2 + b_{ij}^2}\right) V_{ir} - \frac{g_{ij} b_{i0}}{g_{ij}^2 + b_{ij}^2} V_{im} - \frac{g_{ij}}{g_{ij}^2 + b_{ij}^2} I_{ijr} - \frac{b_{ij}}{g_{ij}^2 + b_{ij}^2} I_{ijm} \quad (38)$$

$$V_{jm} = \frac{g_{ij} b_{i0}}{g_{ij}^2 + b_{ij}^2} V_{ir} + \left(1 + \frac{b_{ij} b_{i0}}{g_{ij}^2 + b_{ij}^2}\right) V_{im} + \frac{b_{ij}}{g_{ij}^2 + b_{ij}^2} I_{ijr} - \frac{g_{ij}}{g_{ij}^2 + b_{ij}^2} I_{ijm} \quad (39)$$

$$V_{jr} = t_{ij} V_{ir} - \frac{t_{ij} g_{ij}}{g_{ij}^2 + b_{ij}^2} I_{ijr} - \frac{t_{ij} b_{ij}}{g_{ij}^2 + b_{ij}^2} I_{ijm}, \quad (40)$$

$$V_{jm} = t_{ij} V_{im} + \frac{t_{ij} b_{ij}}{g_{ij}^2 + b_{ij}^2} I_{ijr} - \frac{t_{ij} b_{ij}}{g_{ij}^2 + b_{ij}^2} I_{ijm}, \quad (41)$$

-continued $$V_{jr} = \frac{1}{t_{ij}}V_{ir} - \frac{t_{ij}g_{ij}}{g_{ij}^2 + b_{ij}^2}I_{ijr} - \frac{t_{ij}b_{ij}}{g_{ij}^2 + b_{ij}^2}I_{ijm}, \quad (42)$$

$$V_{jm} = \frac{1}{t_{ij}}V_{im} + \frac{t_{ij}b_{ij}}{g_{ij}^2 + b_{ij}^2}I_{ijr} - \frac{t_{ij}g_{ij}}{g_{ij}^2 + b_{ij}^2}I_{ijm}, \quad (43)$$

Then using the calculated voltage at bus j, and active and reactive power from bus j to bus i, 535 to determine the pseudo measurements of currents from bus j to bus i, 540. The variances of calculated voltage, and pseudo current measurements can be determined by using Equation (30) and above equations accordingly.

The example 502 represents a situation that a branch is measured only by a RTU, but an adjacent branch is measured by a PMU. The voltage of bus associated with RTU is firstly determined based on the PMU voltage and current measurements at the adjacent branch, and then based on the voltage and RTU power measurements, the pseudo current measurements are determined accordingly. In this scenario, there are two branches, one is between bus i, 550 and bus j, 555, and the other is between bus j, 555 to bus k, 560. Bus i 550 is connected to the PMU, and both the voltage of bus i, $V_i$ 565 and current flowing from bus i to bus j, $I_{ij}$ 570 are measured by the PMU. Bus j 555 is connected to the RTU, and the active and reactive powers flowing from bus j 555 to bus k 560, $P_{jk}+jQ_{jk}$ 575 is measured by the RTU. For this example, a voltage at bus j 555, $V_j$ is first determined based on equation (38), (39) for a line branch, and (40), (41) or (42) and (43) for a transformer branch. The required pseudo current $I_{jk}$ 580 is then calculated based on equations using Equation (36) and (37) by replacing subscript i with k. The variances of pseudo current measurements can also be determined based on those equations and equation (30).

Constant Coefficient Matrix of Linear Estimation Model

According to the type of measurement and state, the coefficient matrix can be partitioned into twelve sub-matrices:

$$H = \begin{bmatrix} H_{V_r^{PMU}V_r} & H_{V_r^{PMU}V_m} \\ H_{V_m^{PMU}V_r} & H_{V_m^{PMU}V_m} \\ H_{I_r^{PMU}V_r} & H_{I_r^{PMU}V_m} \\ H_{I_m^{PMU}V_r} & H_{I_m^{PMU}V_m} \\ H_{I_r^{PSEUDO}V_r} & H_{I_r^{PSEUDO}V_m} \\ H_{I_m^{PSEUDO}V_r} & H_{I_m^{PSEUDO}V_m} \end{bmatrix}, \quad (44)$$

wherein the subscripts use a pair of two variables to represent the corresponding types of measurements and states. The constant matrix H is constructed based on the measurement location and branch current equations described in the section of transmission line and transformer models.

$H_{V_r^{PMU}V_r}$ represents the relationship between the real part of the PMU voltage measurements over the real part of the voltage state of buses. For each row of the matrix, only one element at the column corresponding to the bus connected to the PMU has a value of 1.0, and all others are zero. $H_{V_r^{PMU}V_m}$ represents the relationship between the real part of PMU voltage measurements over imaginary part of voltage state of buses, and is a zero matrix.

$H_{V_m^{PMU}V_r}$ represents the relationship between the imaginary part of PMU voltage measurements over imaginary part of voltage state of buses. For each row of the matrix, only one element has value of 1.0 and which is at the column corresponding to the bus that PMU installed, and all others are zero. $H_{V_m^{PMU}V_r}$ represents the relationship between the imaginary part of PMU voltage measurements over real part of voltage state of buses, and is a zero matrix as well.

$H_{I_r^{PMU}V_r}$ and $H_{I_r^{PMU}V_m}$ represents the relationship between the real part of PIM current measurements over real and imaginary part of voltage state of buses, $H_{I_r^{PSEUDO}V_r}$ and $H_{I_r^{PSUEDO}V_m}$ represent the relationship between the real part of pseudo current measurements over real and imaginary part of voltage state of buses. The values of elements of those matrices are determined according to Equation (5) for a line branch, and equation (9) or (11) for a transformer branch.

$H_{I_m^{PMU}V_r}$ and $H_{I_m^{PMU}V_m}$ represents the relationship between the imaginary part of PMU current measurements over real and imaginary part of voltage state of buses, and $H_{I_m^{PSUEDO}V_r}$ and $H_{I_m^{PSEUDO}V_m}$ represents the relationship between the imaginary part of pseudo current measurements over real and imaginary part of voltage state of buses. The element values of those matrices are determined according to Equation (6) for a line branch, and equation (10) or (12) for a transformer branch.

Weighted Least Square Estimation of SCADA Areas

For a SCADA area, the measurements z and state variables x can be related as follows:

$$z = h(x) + e, \quad (45)$$

wherein h(x) is a nonlinear relationship between the measurement and state variables.

According to weighted least square principle, the state estimate can be found by solving the minimization of the scaling function J(x):

$$J(x) = [z - h(x)]^T R^{-1} [z - h(x)], \quad (46)$$

since h is a nonlinear function of x, an iterative procedure is used to obtain the solution of state estimation. The normal equation used for solving for the state changes, at each iteration, is $$G\Delta x = H^T R^{-1} \Delta z, \quad (47)$$

where, $\Delta x$ is the vector of state changes, $\Delta z = z - h(x)$ is the vector of mismatches between measurements and true values, $$H = \frac{\partial z}{\partial x}$$

is the Jacobian matrix that represents the sensitivity of measurement variables with respect to the state variables, and G is the gain matrix, $G = H^T R^{-1} H$. The sparse Cholesky decomposition is used to solve for the state changes expressed in Equation (47). The solution of Equation (47) is repeated until the state changes are less than a threshold, or a given maximum iteration number is reached.

States and Measurements of Nonlinear Estimation Model

One embodiment uses polar coordinates to formulate the state estimation model for SCADA observed areas. The states for each SCADA observed area are represented by the magnitude and phase angle of complex bus voltages for each bus in the area:

$$x = \begin{bmatrix} |V| \\ \theta_V \end{bmatrix}, \quad (48)$$

wherein |V| v and $\theta_V$ are the vectors of magnitudes and phase angles of voltages of buses in the SCADA observed area respectively.

The measurements for each SCADA observed area includes the SCADA voltage magnitude measurements, SCADA active and reactive power measurements, and pseudo voltage measurements determined based on the results of first-level state estimation:

$$z = \begin{bmatrix} |V|^{SCADA} \\ P^{SCADA} \\ Q^{SCADA} \\ |V|^{PSEUDO} \\ \theta_V^{PSEUDO} \end{bmatrix}, \quad (49)$$

wherein, $|V|^{SCADA}$ is the vector of voltage magnitude of buses measured by RTUs, $P^{SCADA}$ and $Q^{SCADA}$ are the vectors of active and reactive powers of line or transformer branches measured by RTUs, and $|V|^{PSEUDO}$ and $\theta_V^{PSEUDO}$ are the pseudo magnitude and phase angle measurements of voltages of common buses between the study area and PMU areas.

The pseudo voltage measurements are determined based on the first level estimation results, that is, the estimated voltages at the common buses between the area with PMU areas. Since the results are provided in rectangular coordinates, Equations (50) and (51) are used to convert those values into polar coordinates:

$$|V_i| = \sqrt{V_{ir}^2 + V_{im}^2}, \quad (50)$$

$$\theta_{V_i} = \tan^{-1}\frac{V_{im}}{V_{ir}}, \quad (51)$$

Accordingly, based on the equations (30), (50) and (51), the variances of pseudo magnitude and phase angle measurements of voltages can be determined as:

$$\sigma_{|V_i|}^2 = \frac{V_{ir}^2 \sigma_{V_{ir}}^2 + V_{im}^2 \sigma_{V_{im}}^2}{V_{ir}^2 + V_{im}^2}, \quad (52)$$

$$\sigma_{\theta_{V_i}}^2 = \frac{V_{im}^2 \sigma_{V_{ir}}^2 + V_{ir}^2 \sigma_{V_{im}}^2}{(V_{ir}^2 + V_{im}^2)^2}, \quad (53)$$

wherein, $\theta_{|V_i|}^2$ and $\sigma_{\theta_{V_i}}^2$ are the required variances of the pseudo measurements of magnitude and angle of voltage at bus i, $\sigma_{V_{ir}}^2$ and $\sigma_{V_{im}}^2$ are the variances of real and imaginary part of voltage at bus i determined by using Equation (21).

Accordingly, the measuring error vector and covariance matrix can be partitioned based on the type of measurements:

$$e = \begin{bmatrix} e_{|V|^{SCADA}} \\ e_{P^{SCADA}} \\ e_{Q^{SCADA}} \\ e_{|V|^{PSEUDO}} \\ e_{\theta_V^{PSEUDO}} \end{bmatrix}, \quad (54)$$

-continued $$R = \text{diag}\begin{Bmatrix} \sigma_{|V|^{SCADA}}^2, \sigma_{P^{SCADA}}^2, \sigma_{Q^{SCADA}}^2, \\ \sigma_{|V|^{PSEUDO}}^2, \sigma_{\theta_V^{PSEUDO}}^2 \end{Bmatrix}, \quad (55)$$

wherein, $e_{|V|^{SCADA}}$, $e_{P^{SCADA}}$, $e_{Q^{SCADA}}$, $e_{|V|^{PSEUDO}}$ and $e_{\theta_V^{PSEUDO}}$ represents the measuring errors of SCADA voltage magnitude measurements, SCADA active power and reactive power measurements, pseudo voltage magnitude and phase angle measurements, and $\sigma_{|V|^{SCADA}}^2$, $\sigma_{P^{SCADA}}^2$, $\sigma_{Q^{SCADA}}^2$, $\sigma_{|V|^{PSEUDO}}^2$ and $\sigma_{\theta_V^{PSEUDO}}^2$ represents the variances of SCADA voltage magnitude measurements of buses, SCADA active and reactive power measurements of line or transformer branches, pseudo voltage magnitude and phase angle measurements of buses common to the study area and PMU areas.

Jacobian Matrix of Nonlinear Estimation Model

According to the type of measurement and state, the Jacobian matrix can be partitioned into ten sub-matrices:

$$H = \begin{bmatrix} H_{|V|^{SCADA}_{|V|}} & H_{|V|^{SCADA}_{\theta_V}} \\ H_{P^{SCADA}_{|V|}} & H_{P^{SCADA}_{\theta_V}} \\ H_{Q^{SCADA}_{|V|}} & H_{Q^{SCADA}_{\theta_V}} \\ H_{|V|^{SCADA}_{|V|}} & H_{|V|^{PSEUDO}_{\theta_V}} \\ H_{\theta_V^{PSEUDO}_{|V|}} & H_{\theta_V^{PSEUDO}_{\theta_V}} \end{bmatrix}, \quad (55)$$

wherein a pair of two variables are used as subscripts of matrices to represent the corresponding types of measurements and states. The Jacobian matrix H is constructed based on the measurement location and branch power equations described in the section of transmission line and transformer models.

$H_{|V|^{SCADA}_{|V|}}$ and $H_{|V|^{SCADA}_{\theta_V}}$ represents the sensitivity of the SCADA voltage magnitude measurements over the magnitude and the phase angle of voltage state of buses. For each row of the matrix $H_{|V|^{SCADA}_{|V|}}$, only one eleMent has value of 1.0 which is at the column corresponding to the bus that RTU installed, and all others are zero. $H_{|V|^{SCADA}_{\theta_V}}$ is a zero matrix.

$H_{P^{SCADA}_{|V|}}$ and $H_{P^{SCADA}_{\theta_V}}$ represents the sensitivity of SCADA active power measurements over the magnitude and phase angle of voltage state of buses. The values of elements of those matrices can be determined by calculating the derivatives of active powers of branches with respect to magnitude and phase angle of voltages of buses with the latest voltage state estimate. Equation (7) is used to determine the required derivatives for a line branch, and equation (13) or (15) is used for a transformer branch.

$H_{Q^{SCADA}_{|V|}}$ and $H_{Q^{SCADA}_{\theta_V}}$ represents the sensitivity of SCADA reactive power measurements over the magnitude and phase angle of voltage state of buses. The values of elements of those matrices can be determined by calculating the derivatives of reactive powers of branches with respect to magnitude and phase angle of voltages of buses with latest voltage state estimate. Equation (8) is used for a line branch, and equation (14) or (16) is used for a transformer branch.

$H_{|V|^{PSEUDO}_{|V|}}$ and $H_{|V|^{PSEUDO}_{\theta_V}}$ represents the sensitivity of pseudo voltage magnitude measurements over the magnitude and phase angle of voltage state of buses. For each row of matrix $H_{|V|^{PSEUDO}_{|V|}}$, only the element at the column of corresponding bus has a value of 1.0 and all others are zero. The matrix $H_{|V|^{PSEUDO}_{\theta_V}}$ is a zero matrix.

$H_{\theta_V^{PSEUDO}|V|}$ and $H_{\theta_V^{PSEUDO}\theta_V}$ represents the sensitivity of pseudo voltage phase angle measurements over the magnitude and phase angle of voltage state of buses. For each row of the matrix $H_{\theta_V^{PSEUDO}\theta_V}$, only the element at the column of corresponding bus has a value of 1.0 and all others are zero. The matrix $H_{\theta_V^{PSUEDO}|V|}$ is a zero matrix.

Among the sub-matrices, $H_P^{SCADA}|V|$, $H_P^{SCADA}\theta_V$, $H_Q^{SCADA}|V|$ are $H_Q^{SCADA}\theta_V$ are depended on the state estimate, so they are updated when a new state estimate is available. All other sub-matrices are kept constant during the iterations.

EXAMPLE

Figure 6:
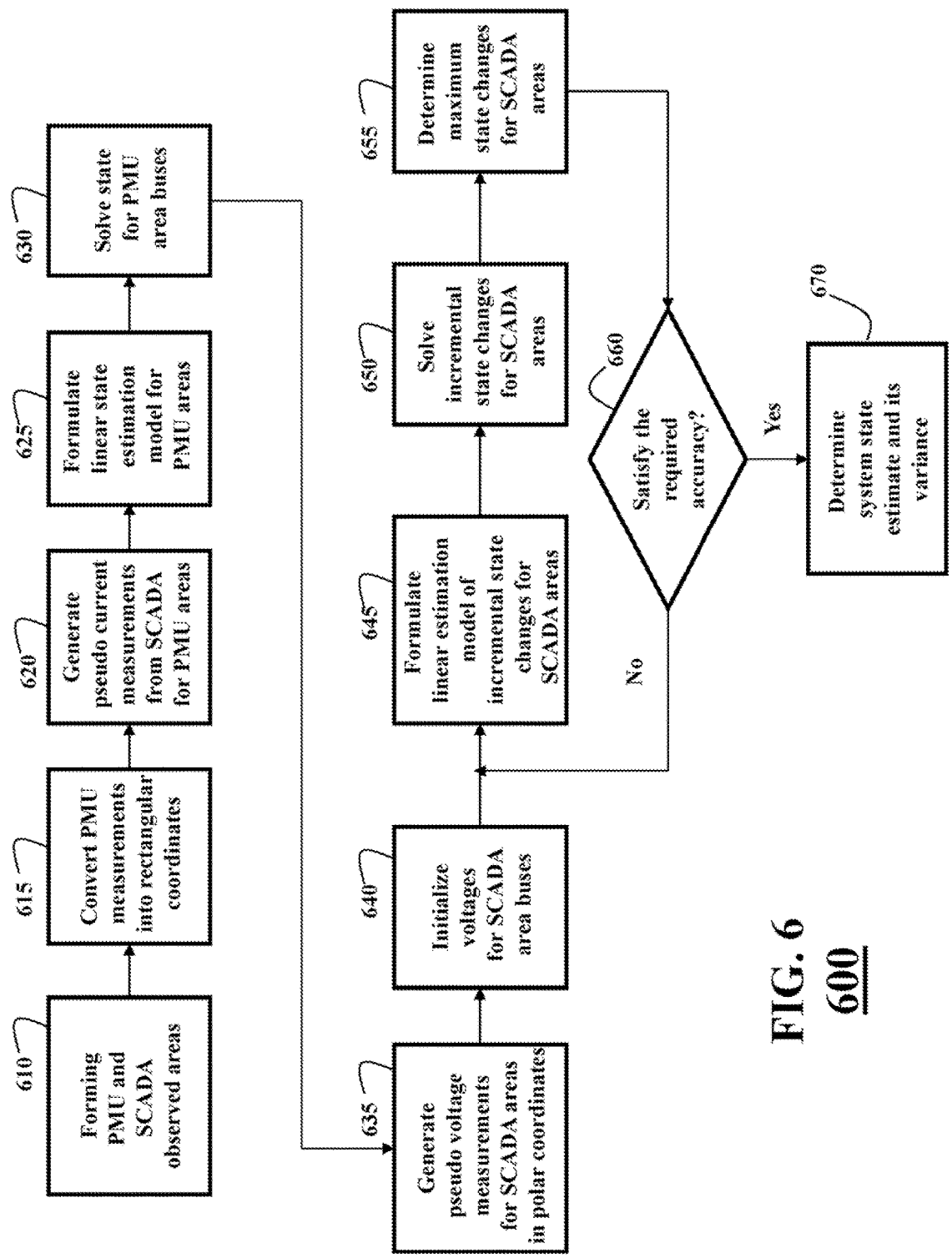
FIG. 6 is a block diagram of a method for estimating states of a power system with hybrid PMU and SCADA measurements according to some embodiments of the invention.

FIG. 6 shows a block diagram of a method 600 for determining the states of a power system using hybrid PMU and SCADA measurements according to one embodiment of the invention. Various embodiments of invention can use various steps of the method 600.

In step 610, based on the topology of the connectivity and type of measurement unit, the buses of the power system are grouped into the set of PMU observed areas, and the set of SCADA observed areas as shown in FIG. 2.

In step 615, all the PMU measurements and associated variances expressed in polar coordinates are converted into rectangular coordinates, including bus complex voltages, and branch complex currents.

In step 620, a set of pseudo branch current measurements are generated based on the SCADA measurements of powers on the branches and PMU measurements on the associated buses for the PMU observed areas.

In step 625, according to the latest PMU measurements and pseudo measurements generated in step 620, a linear state estimation is formulated in rectangular coordinates for each PMU observed area based on the relationship between the measurements and state of buses, and the real and imaginary part of bus voltage are taken as the state variables.

In step 630, a sparse matrix factorization, e.g., the sparse Cholesky decomposition, is used to solve the complex voltage for each bus in the PMU observed area.

In step 635, a set of pseudo voltage and phase angle measurements for the common buses between the SCADA area and the PMU areas is generated and the associated variance are set based on the diagonals of covariance of voltage and phase angle estimates determined in step 630.

In step 640, the complex voltages for all buses at the SCADA areas are initialized with the latest estimate.

In step 645, the derivative matrix of measurements over states is determined according to latest estimate of states, and then an linear model is formulated in polar coordinates for each SCADA observed area based on the SCADA measurements and pseudo measurement generated in step 635, and the state variables are the incremental changes of the voltage magnitude and the phase angle for each bus in the area.

In step 650, a sparse matrix factorization, e.g., the sparse Cholesky decomposition is used to obtain the incremental state changes for the buses in a SCADA observed area, and the states of common buses between SCADA and PMU observed areas are also updated with new solution.

In step 655, the maximum state change is determined. In step 660, the required accuracy is tested, and the method continues with step 670, if the mismatches are less than a threshold, or, otherwise, to step 645. In step 670, based on the state estimate update for SCADA observed areas in step 650, and state estimate for PMU observed areas in step 630, a full set of complex voltage estimate of buses is generated, and then the currents and powers for each branch are determined accordingly.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A computer-implemented method for determining voltages of a set of buses of a power system, wherein values of the voltages include a magnitude and a phase angle of the voltages, comprising steps of:
providing a connectivity topology of buses connected through branches, wherein the connectivity topology represents such that a bus of the power system is connected with at least one bus of the power system through a branch, wherein each of the buses is associated with a first type of measurement unit or a second type of measurement unit;
partitioning the set of buses of the power system into a first-type area and a second-type area based on the connectivity topology of the buses and a type of measurement unit associated with each bus, wherein the first-type area and the second-type area have at least one common bus, and wherein all buses in the first-type area are associated with the first type of measurement unit, and all buses in the second-type area are associated with the second type of measurement unit;
calculating the voltages of the buses of the first-type area including the voltage of the common bus based on first type of measurements of the first-type of measurement unit and pseudo measurements derived from second type of measurements of the second type of measurement unit by minimizing a sum of weighted square of measurement errors for all measurements associated with the first-type area; and
calculating the voltages of the set of buses of the second-type area using the voltage of the common bus calculated for the first-type area and the second type of measurements of the second type of measurement unit by minimizing a sum of weighted square of measurement errors for all measurements associated with the second-type area, wherein the steps of the method are performed by a processor.

2. The method of claim 1, wherein the first type of measurement is provided by a phasor measurement unit (PMU), and the second type of measurement is provided by a remote terminal unit (RTU) of supervisory control and data acquisition (SCADA) system.

3. The method of claim 2, wherein the common bus is associated with the RTU and adjacent to a bus associated with the PMU.

4. The method of claim 2, wherein the PMU measures a magnitude and phase angle of the voltage of the bus in the first-type area, and a magnitude and a phase angle of current of a branch connected with the bus in the first-type area, and wherein the RTU measures a magnitude of the voltage of the bus in the second-type area, an active power and a reactive power of a branch connected with the bus in the second-type area.

5. The method of claim 2, wherein the first-type area is formed only by PMU buses associated with the first type of measurement unit, and buses adjacent to at least one PMU bus.

6. The method of claim 1, further comprising:
forming a first model to associate the measurements in the first-type area with the voltages of buses in the first-type area based on measurements for the buses of the first-type area;
solving the first model to determine the voltages of the buses of the first-type area by minimizing the sum of weighted square of measurement errors for all measurements associated with the first-type area;
forming a second model to associate the measurements in the second-type area with the voltages of buses in the second-type area based on measurements for the buses of the second area;
adding to the second model the voltage of the common bus determined for the first area; and
solving the second model to determine the voltages of the buses of the second area by minimizing the sum of weighted square of measurement errors for all measurements associated with the second-type area.

7. The method of claim 6, wherein the first model is a linear model, and the second model is a nonlinear model, further comprising:
solving the first model directly; and
solving the second model iteratively.

8. A method for determining voltages of buses of a power system using hybrid measurements provided by phasor measurement units (PMUs), and remote terminal units (RTUs) of supervisory control and data acquisition (SCADA) system, wherein values of the voltages include a magnitude and a phase angle of the voltages, and wherein the PMU provide measurements of the voltage of the bus and current of a branch, and the RTU provides measurements of the magnitude of the voltage of the bus and active and reactive powers of the branch, comprising steps for:
providing a connectivity topology of buses connected through branches, wherein the connectivity topology represents such that a bus of the power system is connected with at least one bus of the power system through the branch, wherein each of the buses is associated with the PMU or the RTU;
partitioning the buses of the power system into a set of PMU areas and a set of SCADA areas based on the connectivity topology of the buses, where the PMU area has at least one bus common with the SCADA area, and wherein the PMU area is formed by PMU buses and buses adjacent to at least one PMU bus, and wherein the SCADA area is formed by SCADA buses; and
calculating sequentially voltages of the buses of the PMU area, and the voltages of the buses of the SCADA area, wherein the steps of the method are performed by a processor.

9. The method of claim 8, further comprising:
determining the voltages of the buses in the PMU area based on the PMU measurements provided by the PMUs and pseudo measurements determined from the SCADA measurements provided by the RTUs; and
determining the voltages of the SCADA area based on the SCADA measurements and voltages of common buses determined for the PMU areas.

10. The method of claim 9, further comprising:
forming a nonlinear model for each SCADA area; and
solving the nonlinear models iteratively to determine voltages in each SCADA area.

11. The method of claim 10, further comprising:
generating pseudo measurements of voltage of common buses in polar coordinates based on voltages determined for the PMU areas.

12. The method of claim 10, further comprising:
solving the nonlinear models iteratively until changes in the voltages are less than a given threshold.

13. The method of claim 9, further comprising:
forming a linear model for each PMU area, and
solving the set linear models using a sparse matrix decomposition to determine voltages in each PMU area.

14. The method of claim 13, further comprising:
converting the PMU measurements of currents, and the voltages from polar coordinates into rectangular coordinates; and
generating the pseudo measurements of the currents in the PMU area based the SCADA measurements of active and reactive powers.

15. A system for estimating states of buses of a power system using on hybrid measurements provided by phasor measurement units (PMUs), and remote terminal units (RTUs) of supervisory control and data acquisition (SCADA) system, wherein a value of a voltage includes a magnitude and a phase angle of the voltage, and wherein a PMU provide measurements of the voltage of the bus and current of a branch, and a RTU provides measurements of a magnitude of the voltage of the bus and active and reactive powers of a branch, comprising:
a processor for
providing a connectivity topology of buses connected through branches, wherein the connectivity topology represents such that a bus of the power system is connected with at least one bus of the power system through the branch, wherein each of the buses is associated with the PMU or the RTU;
partitioning the buses of the power system into a set of PMU areas and a set of SCADA areas based on the connectivity topology of the buses, where the PMU area has at least one bus common with the SCADA area, and wherein the PMU area is formed by PMU buses and buses adjacent to at least one PMU bus, and wherein the SCADA area is formed by SCADA buses, and for
estimating states of the buses in the set of PMU areas based on the measurements provided by the PMUs and pseudo measurements estimated from SCADA measurements provided by the RTUs, and for
estimating states of the buses in the set of SCADA areas based on the measurements provided by the RTUs and a state of the common bus.

\* \* \* \* \*